United States Patent
Ben-Or et al.

(10) Patent No.: US 9,294,497 B1
(45) Date of Patent: Mar. 22, 2016

(54) METHOD AND SYSTEM FOR BEHAVIORAL AND RISK PREDICTION IN NETWORKS USING AUTOMATIC FEATURE GENERATION AND SELECTION USING NETWORK TOPOLGIES

(71) Applicant: NICE-SYSTEMS LTD., Ra'anana (IL)

(72) Inventors: Pinchas Ben-Or, SE Issaquah, WA (US); Simon Robins, Haifa (IL); Shlomi Cohen-Ganor, Beit Zayit (IL); Yoav Avneon, Nes-Ziona (IL); Diana Shnaider, Modi'in (IL)

(73) Assignee: NICE-SYSTEMS LTD., Ra'anana (IL)

( * ) Notice: Subject to any disclaimer, the term of this patent is extended or adjusted under 35 U.S.C. 154(b) by 0 days.

(21) Appl. No.: 14/584,209

(22) Filed: Dec. 29, 2014

(51) Int. Cl.
*H04L 29/06* (2006.01)
*H04L 12/26* (2006.01)
*G06F 21/57* (2013.01)

(52) U.S. Cl.
CPC .......... *H04L 63/1433* (2013.01); *G06F 21/577* (2013.01); *H04L 43/10* (2013.01)

(58) Field of Classification Search
CPC .......................... H04L 63/1433; G06F 21/577
USPC .......................................................... 726/25
See application file for complete search history.

(56) References Cited

U.S. PATENT DOCUMENTS

| | | | | |
|---|---|---|---|---|
| 8,146,149 B2 * | 3/2012 | Steinkogler | ......... | G06F 19/3418 726/16 |
| 8,392,998 B1 * | 3/2013 | Schrecker | ........... | H04L 63/1416 709/224 |
| 8,495,745 B1 * | 7/2013 | Schrecker | ............. | G06F 21/577 726/25 |
| 8,661,538 B2 | 2/2014 | Cohen-Ganor et al. | | |
| 9,076,330 B2 * | 7/2015 | Bouillet | ............... | G08G 1/0104 |
| 2004/0088646 A1 * | 5/2004 | Yeager | .................... | H04L 29/06 715/229 |
| 2005/0055446 A1 * | 3/2005 | Chidambaran | ........ | G06F 9/5088 709/226 |
| 2005/0086300 A1 * | 4/2005 | Yeager | .................... | G06F 9/544 709/204 |
| 2012/0087665 A1 * | 4/2012 | Li | ........................ | H04J 14/0269 398/79 |
| 2013/0042298 A1 * | 2/2013 | Plaza Fonseca | ...... | G06F 21/335 726/1 |
| 2013/0269028 A1 * | 10/2013 | Nakawatase | ........ | H04L 63/1433 726/22 |
| 2013/0269029 A1 * | 10/2013 | Nakawatase | .......... | G06F 21/577 726/22 |
| 2013/0305356 A1 * | 11/2013 | Cohen-Ganor | ........ | G06Q 40/00 726/22 |
| 2014/0204738 A1 * | 7/2014 | Carter | ..................... | H04L 41/12 370/230 |

* cited by examiner

*Primary Examiner* — Dao Ho
(74) *Attorney, Agent, or Firm* — Pearl Cohen Zedek Latzer Baratz LLP

(57) ABSTRACT

A system or method may include receiving, by a processor, data describing a network, wherein the network includes a plurality of entities and links describing relationships between the plurality of entities. The method may further include identifying a set of seed entities from the plurality of entities based on predefined rules. The method may further include generating a set of sub-networks based on the set of identified seed entities, wherein each of the sub-networks may include one or more other entities of the plurality of entities having at least one link to the at least one seed entity. The method may further include calculating a risk score for each of the generated sub-networks.

13 Claims, 7 Drawing Sheets

FIG. 2
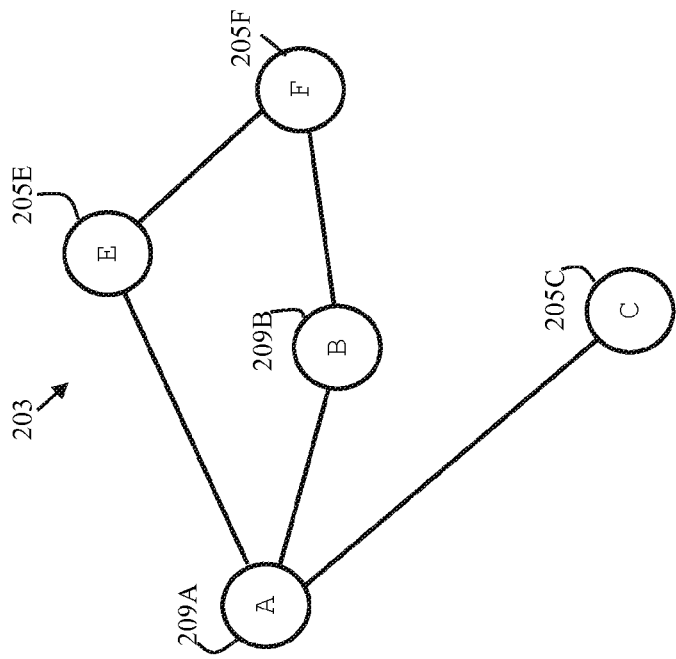
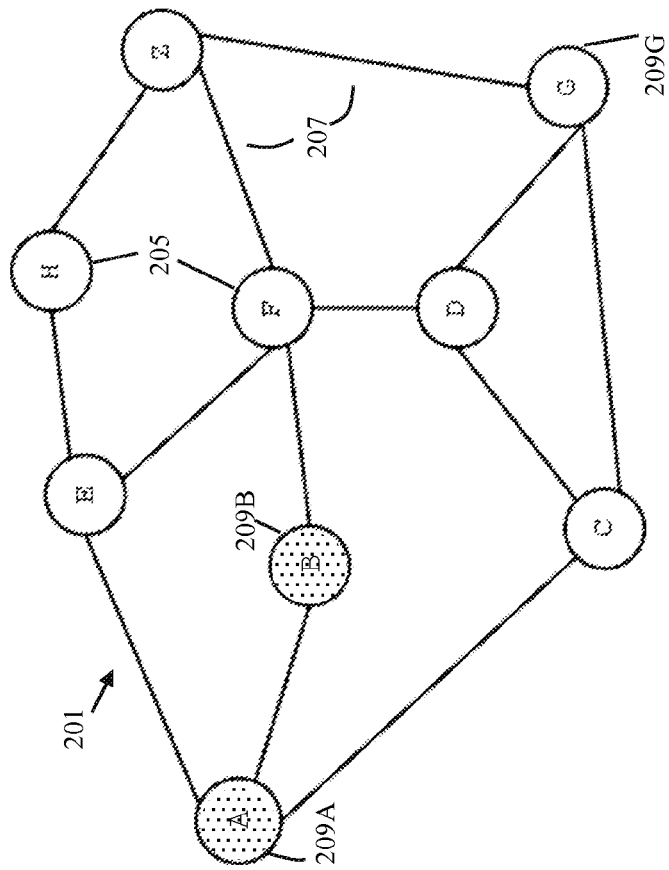

METHOD AND SYSTEM FOR BEHAVIORAL AND RISK PREDICTION IN NETWORKS USING AUTOMATIC FEATURE GENERATION AND SELECTION USING NETWORK TOPOLGIES

FIELD OF THE PRESENT INVENTION

The present invention relates to identifying and analyzing risk in a financial or other network.

BACKGROUND

Detecting and investigating complex fraud schemes may require a deeper understanding of the relationship between or among actors, events and entities than is currently available. Methods and algorithms exist for analyzing social networks in order to determine marketing strategies to deploy within social networks, such as the Facebook network, the LinkedIn network, or in a network of e-mail contacts, for example. These methods may identify responsive target customers for new product launches that then proliferate through the network of these target customers.

Financial fraud schemes may operate through a network of entities and links between entities. Methods used for identifying effective target customers may be used to identify entities and surround networks that are at risk for suspicious financial activity. Within financial networks with a large amount of entities (e.g., customers, agents, suppliers, merchants, financial institutions, bank accounts, and more), it may not be possible to efficiently examine the entire network for suspicious activity. While predictive algorithms exist that may be able to provide a risk score for a financial network, the algorithms may be difficult to apply to large financial networks. Identifying entities and their networks that are at high risk for a financial fraud event may prevent financial fraud from occurring or allow authorities to monitor the network before the event occurs.

SUMMARY

A system or method may include receiving, by a processor, data describing a network, wherein the network includes a plurality of entities and links describing relationships between the plurality of entities. The method may further include identifying a set of seed entities from the plurality of entities based on predefined rules. The method may further include generating a sub-network based on the set of identified seed entities, wherein the sub-network includes the seed entities and other entities of the plurality of entities having at least one link to one or more of the seed entities. The method may further include updating the risk scores for each entity in the sub-network. The method may include calculating a risk score for the generated sub-network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is an illustration of a network and a sub-network, according to embodiments of the invention.

Figure 1:
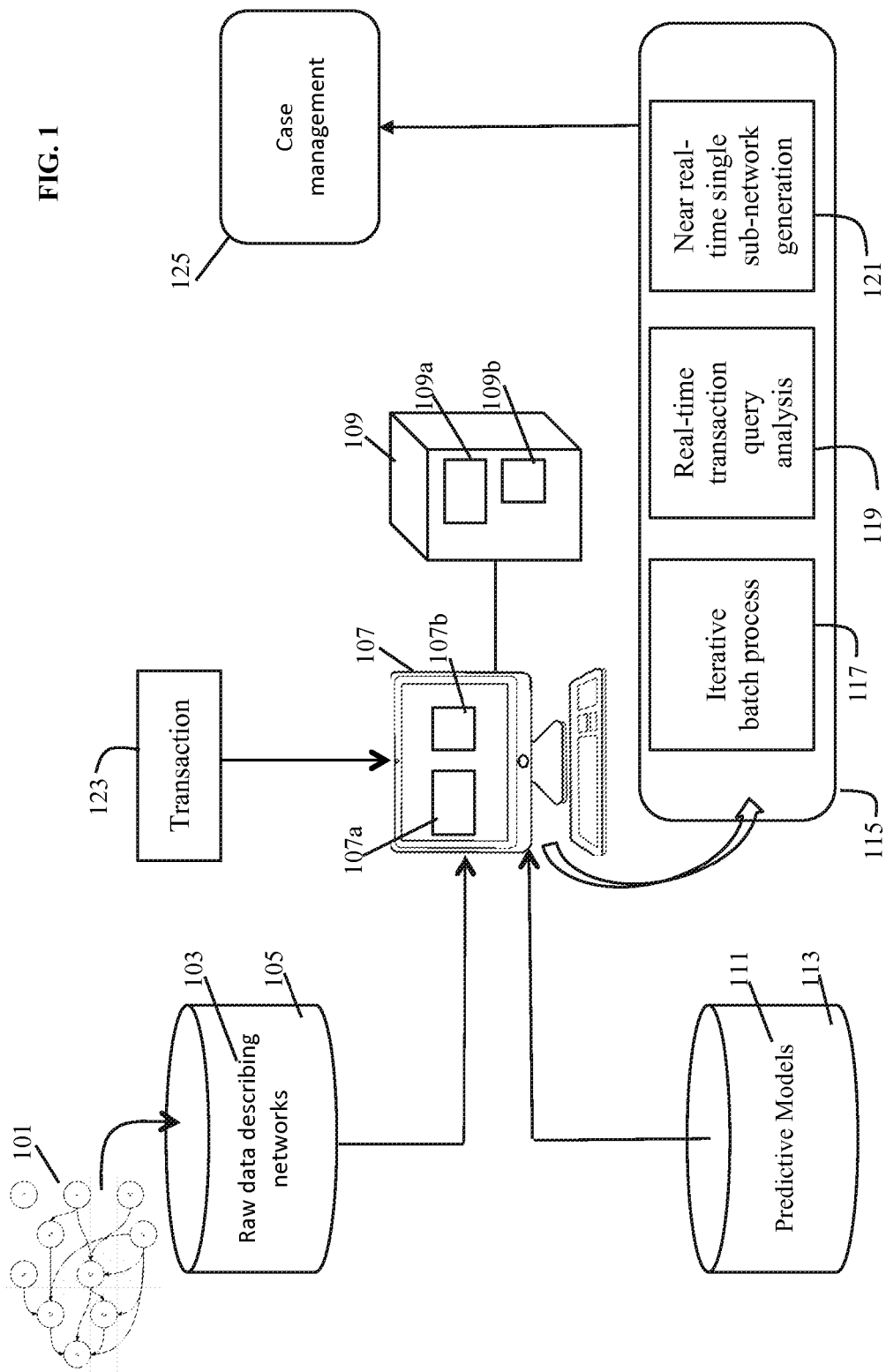
FIG. 1 is a diagram of a computing system for network risk assessment, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may characterize and model known target networks by combining entity features (e.g., characteristics of entities) of the network with their network topology features and links. The known target networks may be part of a larger network, and may be used in an efficient, iterative or looping process to identify or generate suspect sub-networks from larger social networks and generate alerts and/or risk ratings or scores. The methods described herein may be universal in its applicability and efficiency with respect to the types and topologies of the networks that can be detected, and in facilitating the application of multiple predictive algorithms.

A network as used herein may be any cluster or group of entities, individuals, or institutions that may have links or relationships between them. A network as referred to herein may mean both the actual physical network and the data representation of that network. In a network, entities may also be referred to as nodes. Each entity or link may be assigned with or have attributes or properties. In financial networks, an entity may be a bank account, a customer, a person, or a device, for example. The entities may be described by attributes such as (but not limited to) their presence in a cycle, position in a specific path, or acting as a source or a sink. In a network that is directed where connections between entities are defined in a direction (e.g., towards an entity), a source node or entity may have more outgoing flow and a sink may have more incoming flow. In other embodiments, a source node may be defined as having greater outgoing flow or transactions than incoming transaction beyond a threshold and vice versa for a sink. A connecting link may describe a type of relationship between entities and with respect to the entities involved. For example, links may include or describe transactions, geographical proximity, family relationship, "friend" (in the sense of social network) relationship, working relationship and geographical ascription (such as ascribing several devices in the same store, the same mall, or the same city). Data describing a network may thus describe a real-world physical entity with relationships.

Properties or attributes of entities may include profile information, such as summaries of past transactional and event data. For example, profile information may include average account balance, number of check returns, reference data (e.g., addresses, phone number, number of employees) and identifying data (e.g., indices). Properties of links or relationships between entities include type of relationship (for example a relationship of "knows" may contain a "from where" property), as well as reference data, related profiles and identifications. The link properties may be highly dependent on the relationship type. For example if the relationship is a direct link representing a specific action (such as transaction) it may include basic data of the transaction (e.g., amount, date), however if the link represents an aggregation of some kind (such as transaction history) it may include profile and reference data as well (average amount, first transfer etc.).

Embodiments of the invention may allow (i) the automatic generation of large potential predictive features that combine rich descriptions of the entities and the variety of their interrelationships with the target network's topological features, (ii) the iterative or looping or repetitive application of a hierarchy of predictive algorithms that exploit these topological features and enable efficient application to large social networks, and (iii) the expert score-card models and/or outputs of supervised machine-learning algorithms.

A system or method for network risk assessment may provide various fraud alerts on whether an entity or sub-network (e.g., a network within a network, where the entities in the sub-network are a subset of entities within the networks) is at risk for suspicious financial activity. An example of suspicious financial activity may be, for example, a muleringwhere money mule networks of individuals may engage in the transfer of stolen funds and may retain a percentage for the transfer. The alerts may be based on sub-network characteristics, such as sub-network topology, complexity, directionality, density or isolation. A rating or score may be provided to describe the likelihood or severity of fraud occurring with an entity or sub-network. The score may be based, at least in part, on expert models or predictive models known in the art. These models may use different algorithms to predict or classify events based on historical data or analysis. While these expert models may receive whole networks as input, it may be more efficient to calculate scores on parts of a network, for example, parts that are more closely related to fraud. Results of a network risk assessment using expert models may be sent to a case manager application that may support the organizational compliance process for internal review and investigation of suspicious activities. The case manager may separately allow an organization (e.g., financial crime authorities or financial institutions) to make decisions and take specific actions on entities that are labeled high risk. The decisions and actions may result in, for example, suspending an account, canceling a transaction, or providing a warning to individuals affected. Case manager applications may allow, for example, authorized staff to receive scored and filtered alerts, each accompanied with all related alert information; routing alerts to principal reviewers and track and audit alerts through resolutions, according to an organization's procedures; internal reporting and options for sending alert information by email and exporting information to other file formats; and managing rules and authorization between users so that administrators may access alerts appropriate for their roles within the organization. Other actions or decisions may be provided by case management.

Embodiments of the invention may perform a network risk assessment by receiving data describing a network, such as a graph or a table of entities and links describing relationships between the entities. Using predefined rules that consider different variables and attributes of entities including known risk scores of entities in the network, starter or seed entities may be identified, and a set or group of sub-networks may be identified or generated based on seed entities. Each of the sub-networks may include at least one seed entity and one or more other entities in the network having at least one link to the at least one seed entity. In the set of sub-networks, one sub-network may be generated for each identified seed entity. For example, in a network of 2 million entities, 20,000 entities may be identified as seed entities, based on predefined rules. The rules may include, for example, identifying seed entities if they have a known risk score greater than a threshold. Other kinds of rules or attributes may be used. For the 20,000 seed entities, 20,000 sub-networks may be generated, where each sub-network is based on one of the 20,000 identified seed entities. A plurality of sets of sub-networks may be generated iteratively.

Each entity in the network may or may not have known risk scores. The seed entities from (e.g., belonging to the group of) the plurality of entities in the network may be chosen or identified by having a risk score greater than a threshold, for example. Risk scores may be any numerical value that describes a quantity or likelihood of risk for suspicious financial activity or illegal activity. A risk score for an entity may indicate a likelihood that that entity is involved in suspicious financial activity, and a risk score for a sub-network or network may indicate a likelihood that fraud or suspicious activity is occurring within the sub-network or network. Identifying an exact victim or perpetrator of the suspicious activity may require the action of a policy manager or an investigation. The risk score may quantify the probability of events of certain types, which may include manifestations or elements of financial crime, such as the establishment of a new account for the purpose of using it for obtaining a fraudulent loan or extracting funds from other accounts taken over, money transfers to fraudulent accounts from accounts with compromised access, unauthorized transactions or transfers of money, transferring of money without the proper credit by rolling it forward in short period of time. Other events demonstrating suspicious financial activity may include detection of account takeover from a web-device session or application fraud. Application fraud events may include two categories. One category may be where a criminal assumes another person's identity (identity theft), solely for the purpose of an application. The application may be anything from a phone contract or credit card account to a loan or a mortgage. The second category of application fraud may be financial fraud, where an applicant has used his or her own name but has made an application for an account, policy, service or insurance claim which contains a material falsehood, such as false employment details, false income, or concealed addresses. The use of a false document (such as a pay slip, bank statement or driving license), when applying for an account, policy, service or insurance claim may also fall within this category.

Online account takeovers may be one form of identity theft. They may occur when an unauthorized party gains online access to an existing bank account by stealing the access credentials to the account. The unauthorized party may then conduct illegal transactions. These incidents may be increasing in both frequency and levels of financial loss today. The target of an account takeover may be a customer holding an account at the financial institution. The ultimate goal of a takeover may be to remove, steal, procure, or otherwise affect funds of the targeted customer. While account takeovers may most often achieved through the use of malicious software that can exploit just one entry point (Point of Compromise, or POC) into a network to start the theft, unauthorized users may also use social interaction to prompt individuals into disclosing account information. This information allows other fraudulent users to access the account and move the money out of the account in a very short time.

For example, risk scores may be between 0 and 1, where 1 describes a high likelihood, or 0 and 100 where 100 describes a high likelihood and 0 describes a low likelihood. Other values may be used, which may be corrective, for example. Corrective values may have negative values, and may indicate a likelihood or quantity of legal or non-suspicious activity. A sub-network based on the set of starter or seed entities (a set of starter or seed entities may include one or more entities) may include the seed entities and other entities defined by the received data as having at least one link or relationship to the one or more seed entities. Other entities may be included, such as entities that are two or more links away from the seed entities. The number of links or edges away from (e.g., needed to get to, using hops across links, another node) a seed entity may be called a degree. For example, a sub-network of degree 3 may include all entities linked to the seed entities by up to 3 links. Using an expert model or other predictive models, the risk rating or scores for each entity in the sub-network may be updated (e.g., re-done, or recalculated) based on the relationship or proximity to the seed entities (which may have a known risk score). A risk score or rating may further be calculated for the sub-network. Embodiments of the invention may use the updated risk scores to iteratively identify a different set of seed entities generate a different set of sub-networks based on the new set of seed entities, and update more entities of those sub-networks. Risk scores may be calculated for each of the sub-networks in the new set of sub-networks. The list of sub-networks generated may be used to analyze (possibly in real time, e.g., less than a second), a received transaction between entities and determine whether the transaction includes suspicious or criminal financial activity, or if it is likely that such a case exists. The iterative process may further calculate key indicators for the network and generated sub-networks. Key indicators may be profile-based predictive variables that address different aspects of the monitored behavior. In this case, monitored behavior may be various transactions occurring between entities, such as payments or funds transfers. Key indicators (KIs) may be statistically calculated variables that combine raw data elements. These combinations involve evaluation of changes in volume, value and velocity, and other factors. Key indicators may be further combined to calculate complex key indicators. For example, a first key indicator may be a network size and a second key indicator may be an average amount of outgoing transfers within a network. A combination key indicator may divide the first key indicator by the second key indicator. Another example may be a combination of KIs describing simple network attributes (such as a number of incoming transactions vs. a number of outgoing transactions with a combination of the next levels incoming and outgoing relationships) in order to calculate a complex KI representing isolation degree. Other complex KI's may be calculated from simple KI's.

FIG. 1 is a diagram of a computing system for network risk assessment, according to embodiments of the invention. Raw data describing networks 103, for example a plurality of entities and their relationships, may be stored in memory 105 or other storage devices. The raw data may be in the form of a graph 101, for example, or a table, hash table or other data structure. A computer 107 or other computing device (e.g., a laptop, desktop, or tablet) may receive the raw data and perform a network risk assessment on the data on a processor 107a using algorithms and software stored on memory 107b. Computer 107 may also be connected to a server 109 which also includes one or more processors 109a and memory 109b. Using predictive models 111 or expert models, which may be stored separately on memory 113 (alternatively, memory 113 and 105 may be on the same device), processor 107a may perform a network risk assessment 115 on received data describing networks 103. The network risk assessment 115 may include for example three processes: iterative batch processing 117, real-time transaction query analysis 119, or near real-time single sub-network generation 121. Other processes may be part of the network risk assessment 115.

The iterative batch process 117 may update or re-calculate risk scores for entities in the network 105 by iteratively generating a plurality of sub-networks based on identified sets of seed entities. Each set of seed entities may be identified based on predefined rules that consider attributes and characteristics of the entities in the graph 101. For each set of seed entities, a set of sub-networks may be generated, where a sub-network is created or generated for each seed entity. For example, some entities in the network 105 may have known risk scores. Entities with risk scores greater than a threshold may be selected as initial or seed entities. A processor (e.g., processor 107a or 109a) may generate a plurality of sets of sub-networks based on each set of seed entities selected. A sub-network may be a subset of the received network 105, which includes at least one of the seed entities and entities of network 105 that have at least one connection or link to the seed entities. Other entities may also be part of the sub-network, such as entities that are two or more links away from the seed entities. Additionally, the sub-network may not include all entities that are linked to the seed entities. The other entities besides the seed entities included in the sub-network may depend on an iteration condition, such as a degree of a sub-network describing the maximum number of links between entities in the sub-network. Each of the sub-networks generated may be provided with a risk score and the entities of the sub-networks may be updated with a risk score. Based on the updated risk scores and calculated risk scores for the sub-networks, a new set of seed entities may be chosen for generation of a new set of sub-networks. Each of the sets of sub-network generated by the iterative batch process 117 may be stored in memory 105.

For real-time transaction query analysis, processor 107a may receive a transaction 123 describing two or more entities and a relationship between them, for example, a transfer of funds between a bank accounts. In real-time, e.g., on the order of a few seconds or less, a risk rating or score may be calculated for the transaction by determining whether the entities in transaction 123 were flagged with a risk score in the iterative batch process 117. The analysis 119 may compare the entities in transaction 123 with entities in the plurality of sub-networks generated by the iterative batch process 117, and use the risk scores determined in the iterative batch process 117 to calculate a risk score for the transaction 123.

For a more in-depth view of a transaction, near real-time single sub-network generation 121 may generate a sub-network based on the entities in transaction 123. The single sub-network may be scored with a risk score and the transaction 123 may also be scored based on a comparison with the generated single sub-network. In one embodiment the single sub-network may be generated in a few minutes at most.

Results of the network risk assessment 115 (e.g., from the iterative batch process 117, real-time analysis 119, or single sub-network generation 121) may be sent to case management software 125 which may analyze the risk scores for sub-networks, entities, and transaction 123 and provide action items for an organization.

Processors 107a and 109a may execute software or code to perform methods describe herein. While FIG. 1 describe specific structures, the various functions distributed among the various units may be performed by different units in other embodiments, and the arrangement or distribution of components may be different. For example, one computer including one or more processors may perform embodiments of the present invention.

Processors 107a and 109a may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 105, 113, 107b, and 109b may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Computer 108 or server 109 may include one or more input devices, for receiving input from a user or agent (e.g., via a pointing device, click-wheel or mouse, keys, touch screen, recorder/microphone, other input components) and output devices for displaying data to a customer and agent, respectively.

FIG. 2 is an illustration of a network 201 and a sub-network 203, according to embodiments of the invention. Network 201 may include entities or nodes 205 and links 207 between the entities 205 that describe relationships between the entities 205. The network 201 may be represented in the form of a graph, for example. Each of the entities 205 may represent an individual or institution involved in a financial transaction, and the links 207 between the entities 205 may describe these transactions, or other kinds of relationships between entities 205, such as a friendship or geographical proximity. Embodiments of the invention may generate a sub-network 203, which may be a subset of network 201. Some or all of the entities 205 in network 201 may have a known risk score. A processor (e.g., processor 107a) may identify seed entities, shown as 209A and 209B, based on predefined rules, such as selecting seed entities which have a risk score greater than a threshold. The risk score, for example, may be a number or score within a defined scale that describes the likelihood of suspicious activity performed by an entity. The threshold may be determined by how many iterations of the algorithm may be performed, or how many sub-networks are to be generated. For example, if only a few sub-networks are generated or created, the threshold may be set lower in order to capture more seed entities within a sub-network. Thresholds may be configurable, and may vary with each iteration, based on a set of rules. For example, the threshold may be based on the number or type of KI's that are used to calculate the risk score for the sub-network.

Sub-network 203 may be generated by including seed entities 209A and 209B and other entities, shown as 205E, 205F, and 205C, which have at least one link to the seed entities 209A and 209B. Depending on iterative conditions, e.g., an iteration where a set of generated sub-networks involve entities two or three links away from starter or seed entities 209A and 209B, other entities 205 may be added to sub-network 203. A risk score may be generated for sub-network 203, and for the entities 205E, 205F, and 205C that are a part of sub-network 203. The risk score calculated in sub-network 203 may be updated in the data structure or table representing network 201. In a next iteration, a new set of seed entities may be used (for example, entities 209A, 209B, and 205F) which have a risk score greater than one threshold or less than another threshold (or based on other predefined rules for the iteration), and a new set of sub-networks may be generated based on the new set of seed entities. For example, entity scores or ratings may be compared to a band or range defined by two thresholds or limits, and if the score or rating is within the band or range, the entity may be chosen for inclusion within the new sub-network. The new set of seed entities may include different seed entities than were used in the original set of seed entities, or the new set of seed entities may include a subset of the seed entities in a previously generated sub-network, depending on the thresholds and rules used. In some embodiments, a set of generated sub-networks may include one sub-network for every identified seed entity. For example, if entities 209A and 209G are identified as seed entities, the set of sub-networks may include two sub-networks that include entities 209A and 209G respectively, and possibly other entities in each of the two generated sub-networks.

Figure 3:
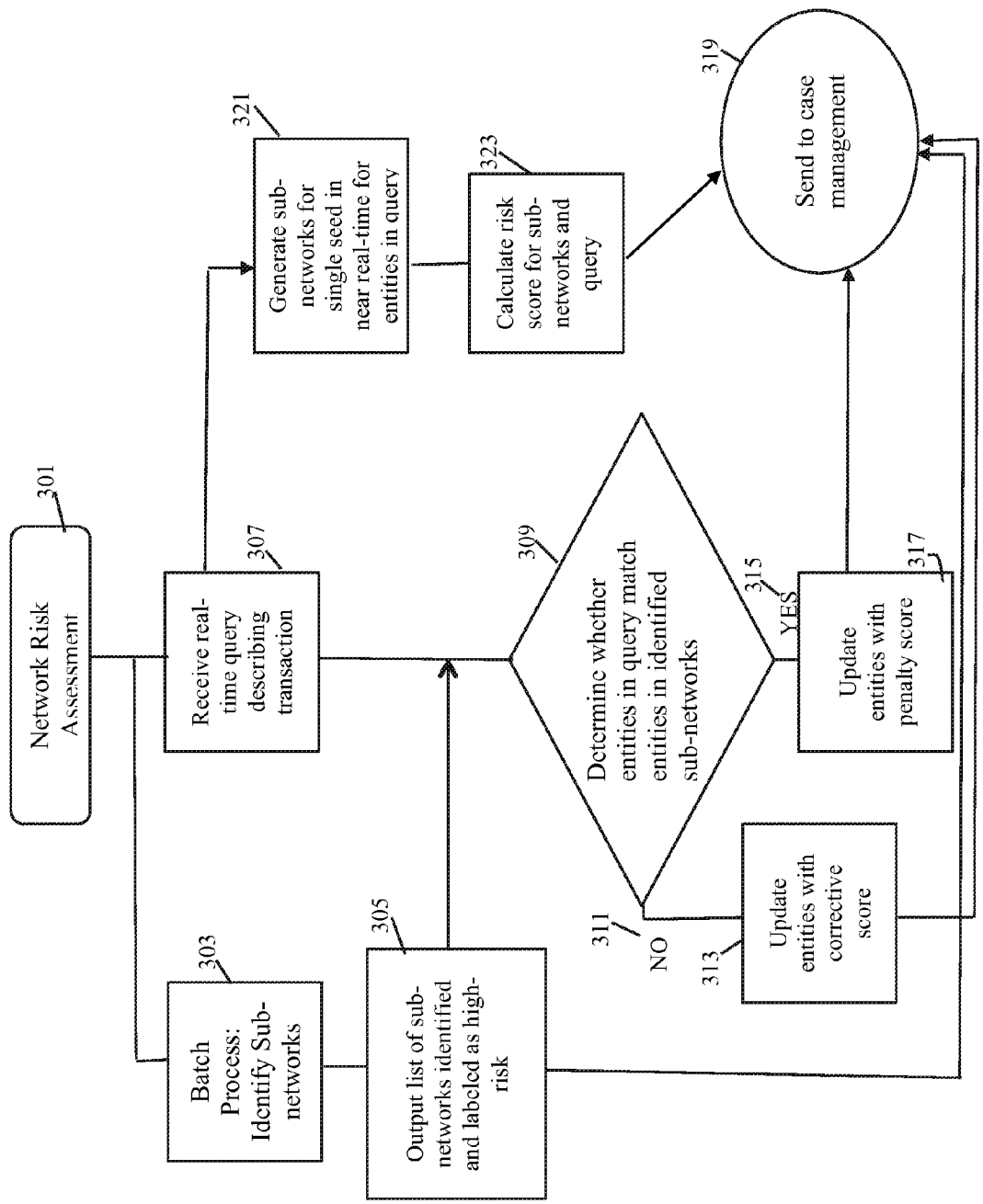
FIG. 3 is a high-level flowchart of the processes in a network risk assessment, according to embodiments of the invention.

FIG. 3 is a high-level flowchart of the processes in a network risk assessment, according to some embodiments of the invention. As explained in FIG. 1 a network risk assessment process 301 may include a batch process 303 that identifies one or more sub-networks within a network. The identification of sub-networks may be an iterative process, where a set of sub-networks is identified in each iteration, and entities in the network may have updated risk scores with each generated sub-network. Since the batch process 303 may use a large amount of network data, the batch process may occur once or a few times per day, for example. In step 305, the batch process may output a list of sub-networks identified and sub-networks labeled as high-risk, e.g., having a high risk score, and the identified sub-networks may be stored in memory (e.g., memory 107b). The identified sub-networks and updated risk scores may be send to case management in step 319. The network risk assessment process may further receive a real-time query describing a transaction between entities 307. Using the list of sub-networks identified in step 305, a processor may determine in step 309 whether entities in the received query match entities in identified sub-networks. If no match is found 311, key indicators describing the received entities and transaction may be updated with a corrective score in step 313. A corrective score may be a score with a negative value, for example, to indicate a likelihood of legal or non-suspicious activity. This may further cause the risk score of the sub-network to be reduced. If a match is found 315, key indicators of the network may be updated with a penalty score in step 317. The transaction may be tagged with the name or identification of matching sub-networks (e.g., indicating that the transaction is present in sub-networks X, Y, Z), and the transaction may be provided with a risk score based on the sub-network scores related to the transaction.

In step 321, based on the received query transaction, a sub-networks may be generated in near real-time for single entities described in the query. The NRT (Near Real Time) process may perform the batch process for the entities described in the transaction, e.g., sub-networks may be generated for the entities described in the transaction. Similar to the batch process, sub-networks may be generated using the transaction entities with increasing levels of detail. For example, a first iteration may generate sub-networks with a degree of 2 (e.g., including other entities 2 degrees away from the transaction entities) and a second iteration may generate sub-networks with a degree of 4 (e.g. including other entities 4 degree away from the transaction entities). In step 323, a risk score may be calculated for the single seed sub-networks and the transaction itself based on the same expert model used in the batch process. The results may also be sent to case management 319.

Figure 4:
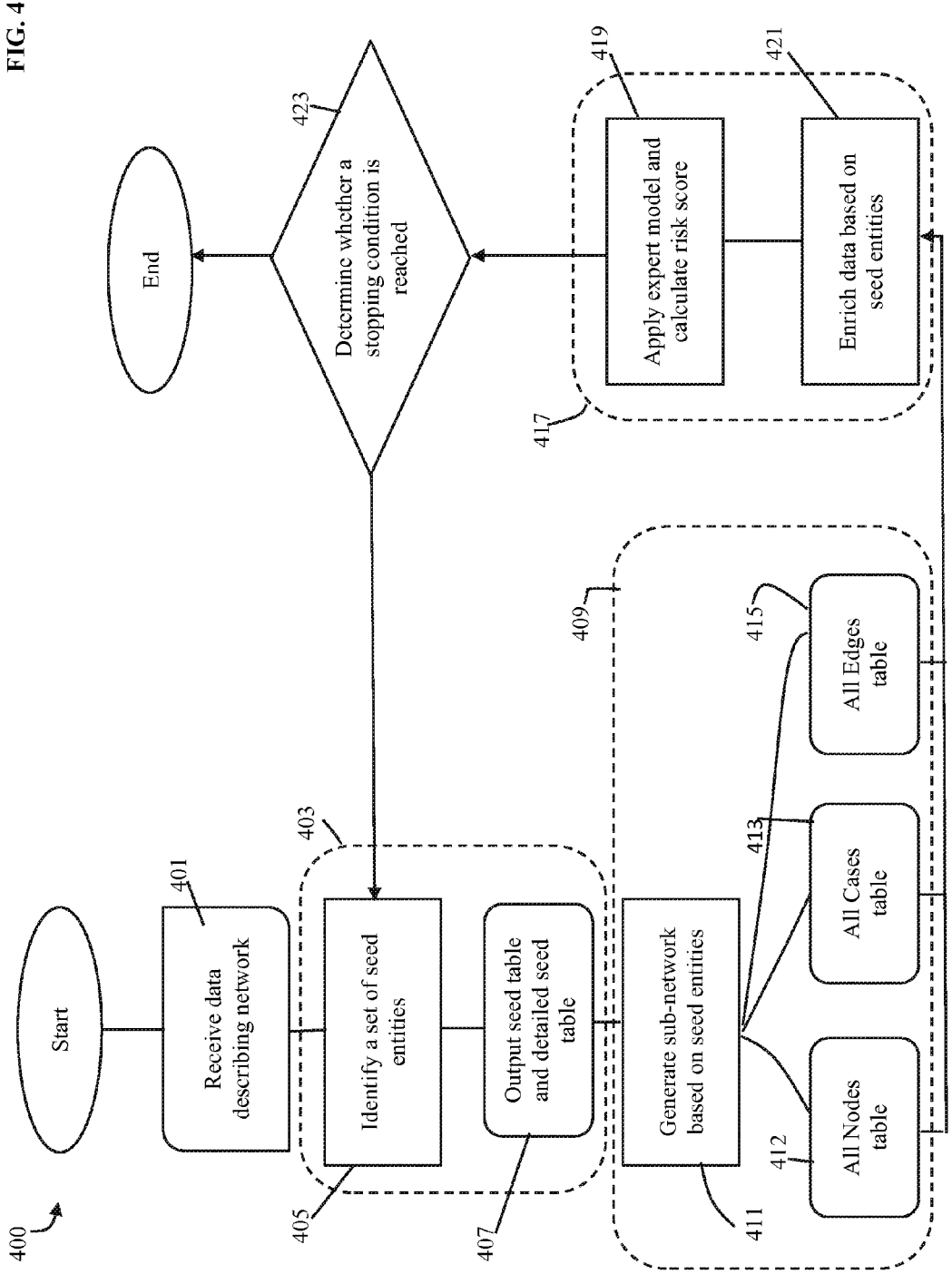
FIG. 4 is a detailed flowchart describing the batch process 400, according to embodiments of the invention.

FIG. 4 is a detailed flowchart describing the batch process 400, according to embodiments of the invention. A system or computing system may initially receive data describing a network 401, such as a graph or a table describing entities or nodes and relationships between the entities. The received data may also be a database of transactions with fields of related data (such as profiles of entities and transaction details). The batch process 400 may include for example three modules, implemented on one or more processors (e.g., processors 107a or 109a). The first module 403 may be for starter or seed detection and selection. In step 405, the first module may identify a set of starter or seed entities based on predefined rules on entities in the received network. The predefined rules may describe characteristics or attributes of entities in the network, for example, entities having a known risk score greater than a threshold. Other rules may be used to identify seed entities that indicate more suspicious activity than usual. The first module 403 may collect and identify these suspicious seed entities (for example, accounts or transactions) and retrieve relevant data related to the seed entities. Using the known score of entities and a set of specific rules, specific entities are marked as suspicious and defined as seeds. For example, one of the predefined rules may require a score greater than entity X which is related to a certain nation can be marked as a seed. The entity X may be related to a certain nation based on information in the entity's profile. An entity's profile information may include summaries of past transactions or events, and may include identifying information, such as account number or address. In another example, the rules may require a score of an entity greater than Y and the entity may be known as previously related to a fraud. In one embodiment seeds may then be assigned variables of 3 main types (other types of variables or variables may be assigned):

Variables which are related directly to the identification of the seed (such as fraud case, alert score and previous fraud)

Variables describing and defining the links between 2 entities (such as the total amount of transactions ever, the total amount of transactions within a specific period of time, first ever transaction between a pair and last ever transaction between a pair)

Profile variables describing the history of links (such as reference data, establishment date of the account and business/personal account).

In step 407, the first module 403 may output a seed table that includes a plurality of high risk transactions between entities, and a detailed seed table, which may be a table of cases based on the seeds. For each pair of entities in the seed table, a sub-network for the pair may be generated and recorded in the detailed seed table. For each transaction, according to the payee in the seed table, all the transactions that involve this payee from the transaction database are selected and variables may be calculated accordingly. The detailed seed table may be formatted so that each row includes a key to the case (the seed identifier or identity (ID); composed of the payer and payee ID) and fields stating the degree of the sub-network and descriptive variables based on the transactions database (such as the total number of transactions, first and last transaction date, the total amount of the transactions, number and total amount of transactions within a determined period etc.).

The starter or seed table and detailed starter or seed table may be input into a second module 409 for sub-network generation. Second module 409 may, in step 411, generate a set of sub-networks based on the identified seed entities, where a sub-network is generated for each seed in a graph database form. The seed table and detailed seed table may be used to determine the starting nodes of the network. Generation of the set of sub-networks may involve combining the seed table with the detailed seed table, which describes each transaction involving the seed entities in combination with reference data and profile data. After the creation or generation of the set of networks and the graph database, the second module 409 may output or update three tables describing several characteristics which compose and describe the set of sub-networks. The first may be an "all nodes" table 411, where each node of the sub-networks represents a single entity. The second characteristic may be an "all cases" table 413. A case may be defined as the network environment of the seeds, or a set of nodes and links and their properties. The case ID assigned for each case may be the seed ID of the respected seed. Practically, each case in the table 413 may be the sub-network of a seed. The case table may include a log of case summaries of each sub-network generated. The third table may be an "all edges" table 415. An edge may be a specific link between two nodes or entities. Other descriptive variables may be generated based on the nodes, cases, and edges. These may include, but are not limited to, presence in a cycle, part of a specific path, and acting as a source and/or a sink. The all nodes 411, all cases 413 and all edges 415 tables may be updated with each set sub-networks generated. For example, in the first iteration, the all nodes table 411 may include one table of all the nodes in the first set of sub-networks, the all cases table 413 may include a summary of each the sub-networks in the set, including a case name, number of nodes, number of cycles in the sub-network, risk score, level, or other summary information, and the all edges table 415 may include one table of all the links between the nodes in the all nodes table 411. In the second iteration, the all nodes table 411 may be updated to further include a second table of nodes for the second set of sub-networks (and/or additional nodes of the sub-networks, from a deeper level of these sub-networks), the all cases table 413 may be updated to include another case name with summary sub-network information, and the all edges table 415 may be updated to include a second table of links between the nodes in the second table of nodes. As each set of sub-networks is generated and updated in these tables, the sub-networks may be analyzed in parallel using predictive models, in the third module 417, described further below. Each iteration may identify a different set of seed entities and generate a set of sub-networks, with one sub-network for each of the seed entities. With each iteration, a smaller number of seed entities may be chosen (and thus a smaller number of sub-networks generated), and each of the sub-networks may have increasing degrees or levels of complexity. For example, a first iteration may generate 5,000 sub-networks using 5,000 identified seed entities, where each of the 5,000 sub-networks has a maximum degree of 3. A second iteration may generate 2,500 sub-networks using 2,500 identified seed entities, where each of the 2,500 sub-networks in the second iteration has a maximum degree of 5. The seed entities in the second iteration may be a subset of the seed entities in the first iteration, or they may be a different set altogether. The selection of the seeds in each iteration may be based on the same predefined rules, or the rules may change with each iteration.

In a third module 417, data describing the sub-network and the sub-network's entities may be enriched in step 419. The third module 417 may further perform the scoring or rating procedure. Based for example on the three output tables described above (e.g., tables 411, 413, and 415 describing entities, cases, and edges respectively), simple and complex variables may be calculated by performing mathematical calculations and joining data. For example, third module 417 may calculate network density and isolation degree and ratios. After the calculation of these various variables third module 417 may apply an expert model and calculate risk scores in step 421. In order to achieve higher accuracy, third module 417 may preform is tuning and adjustment of the model and its coefficients, by procedures such as dimensional reduction, model selection, or AIC (Akaike's Information Criterion) values, for example. Model selection and multi-model inference may be mechanisms to allow ranking and weighting of models as well as selection of the 'best' model from a pre-defined a priori set of models. Akaike's Information Criterion (AIC), or one of a number of related information criteria may be used to rank a series of models applied to a particular dataset. It may be common to use AIC with second order correction (corrected for small sample size; AICc). Next, the difference in AICc for each model in the set may be compared with the minimum AICc (for the best model) in order to calculate Akaike weights which may be known as the probability that each model is the best model, given the data and set of models. Akaike weights can also be used to evaluate the relative contribution of different variables in the set of models. This relative contribution may be referred to as an importance index or a sum of weights. The weights may be summed for all models that contain a given variable to give an indication of the relative importance (hence the name; importance index) of variables across the set of models. Third module 417 may output to a case management application alert data, visualization data, and scores data. Alert data may be, for example, a comma separated values (CSV) file with fields of cases' IDs, fields for their respected score values, a number of KIs involved in generating an alert and description of the KIs. These fields may provide the needed information for a business or security analyst's decision. Visualization data may include a CSV file with fields for nodes identity, relationships between nodes (links) and scores data. This information may be needed for visualization of networks and marking risky elements. Scores data may be a CSV file with fields for cases' IDs, and scores at the feature level (explained further in FIG. 6) and a final score. Other file types and fields may be used.

In step 423, the network risk assessment may determine whether a stopping condition is reached. A stopping condition may be a threshold condition, such as stopping the process only if all entities are greater than a high threshold score or less than a low threshold score. A stopping condition may also apply if a certain amount of entities have been updated in the network. If yes 425, then the process ends. If no 427, a new set of seed entities may be selected for generation of a new set of sub-networks, where the new set of sub-networks may be a deeper level of the previous sub-networks, or may have a higher maximum degree. For near real-time single sub-network generation, the stopping condition may be reached so that only a few sub-networks are generated with increasing levels of complexity, but only based on a single or a few seed entities.

While specific services and modules are described herein, in other embodiments the functionality of methods according to embodiments of the invention may be performed by other sets of modules and services. The processors 107a and 109a may be configured to carry out methods according to embodiments of the invention described herein. The functionality of modules (e.g., first module 403, second module 409, third module 417) and other processes described herein, e.g., risk assessment 115, may be carried out by processors 107a or 109a, for example. For example, processors 107a and 109a may be configured to carry out embodiments of methods according to embodiments of the present invention by executing code or software stored for example in memory 107b and/or 109b.

Figure 5:
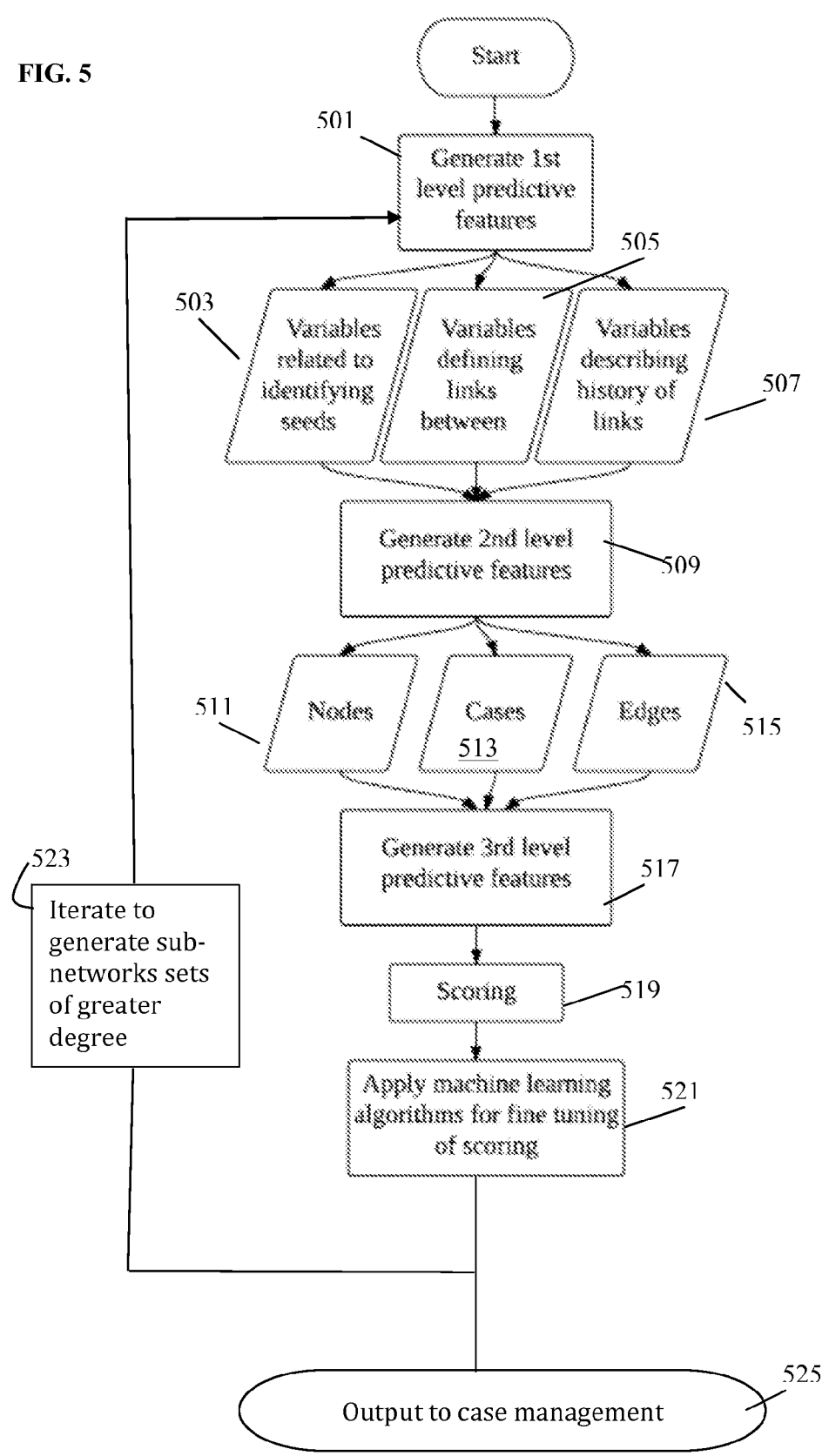
FIG. 5 is a flowchart of an algorithm employed in a network risk assessment, according to embodiments of the invention.

FIG. 5 is a flowchart of an algorithm employed in a network risk assessment, according to embodiments of the invention. Mathematically, a collection of entities may be represented as X, and in a series of iterative steps $N^l(X)$ may describe a network of X as of iteration l. N(X) may be the full network of X, such that:

$N(X)=U_{j=1}^{M} E(Rj)$ which may describe the union of the set of edges (or links) based on the relations $R_1, \ldots, R_M$ I(X) may represent input information about all the entities, and may have the form of a matrix where each row corresponds to an entity and the columns represent various raw input information (raw means pre-network analysis). Raw input information may include profile data, reference data or first order data (e.g., amount of a transaction, for example)

L may be the set of all iterations $(1, 2, \ldots, l, \ldots, L)$, such that $l_x-$, the maximal iteration required for entity x: $l_x \leq L$ For each entity, r(x) may be defined as a final risk estimate of entity x, and $r^l(x)$ may be defined as a risk estimate of entity x at iteration l. Final risk estimate $r(x)=f(N(X), I(X))$; where the risk estimate for x may ideally be based on the full network information and all information about all entities.

Predictive variables or features used at iteration l: $\underline{x}^l = <\underline{x}_e, \underline{x}^l_n, \underline{x}^l_{en}>$ where $\underline{x}_e$ is a constant vector of variables describing entities (the columns of I(X)), $\underline{x}^l_n$ may be defined as the vector of descriptors of the network topology available at iteration l, and $\underline{x}^l_{en}$, may be defined as the vector of variables combining network topology with the 'pointwise' entity data available at iteration l. The descriptors or features of each sub-network may be chosen at each iteration based on their complexity, so that the in each iteration more and more complex variables or features may be evaluated.

Final risk score r(x) may be approximated by r(x) which is based on iterations of network risk analysis, which may be described for example as follows:

$r(x)=r^{l_x}(x)=f^{l_x}(\underline{x}^{l_x})$— where f is the model function or expert model, which can be any statistical function, such as regression (linear or logistic), SVM (support vector machine), NN (neural network), BN (Bayesian network), or a proprietary multi-phased prediction network, as well as a score-card expert model.

The iterative process of a network risk assessment may be governed by an algorithm for determining which variables $\underline{x}^l$ are used in each iteration and by a stopping rule to determine $l_x$. In some embodiments, each iteration may have its own model function.

In general, a predictive feature may have a correlation with a dependent variable (e.g., the variable that is being predicted, such as a risk score of a sub-network for example). Any predictive feature may be defined and proven useful in the context of a predictive model based on machine learning or data mining algorithms. Thus, using this feature may help predict the risk score of sub-networks and entities. If Predictive feature=X, and predicted value=Y and is significantly affected by the value of X, then X may be deemed a predictive feature.

In step 501, for the generated set of sub-networks, 1st level predictive features may be generated, where seed entities may be selected based on available risk models at the entity levels (e.g., in entity profiles). These models may already include some predictors that are based on a second degree neighborhood networks of entities such as accounts, customers, and locations. The creation or generation of 1st level predictive features may include variables related directly to the identification of the seed 503, such as fraud case, alert score, and previous fraud history. Another feature may include variables describing the links between two entities 505, such as the total amount of transactions ever, the total amount of transactions within a specific time period, the first ever transaction between the entities, or the last ever transaction between the entities. Another feature may include profile variables describing the history of the links 507, such as reference data, establishment date of the account and business/personal account information.

In step 509, 2nd level predictive features may be generated for the set of sub-networks. These features may relate to network characteristics in different levels of observation, such as presence in a cycle, position in a specific path, or acting as a source or sink. The neighborhood networks of degree 3 are generated and analyzed. These features may be output along with a sub-networks nodes 511, cases 513, and edges 515, as explained in FIG. 4.

In step 517, 3rd level predictive features may be generated. This may include complex features such as cross observation level calculations and inter-relationships with the larger networks topological features. In step 519, each of the generated sub-networks in the set may be scored based on the predictive features generated in steps 501, 509, and 517, and using an expert model. In step 521, the score may be fine-tuned using, for example, supervised machine-learning algorithms. In step 523, the algorithm may continue through further iterations by generating sets of sub-networks based on different sets of seed entities. Each iteration may include an increased degree for the generated sub-networks and may use a new set of seeds. In each subsequent iteration, seed entities may be selected based on tunable or changing risk threshold, or other pre-defined rules. The maximum degree of the generated neighborhood sub-networks may be increased based on a heuristic rule. For example, the algorithm may be repeated or iterated for any number of generations, and operations 501-521 may be applied to each generated set of sub-networks. For a current generation N, the full set of sub-networks for an $N^{th}$ generation may be extracted, along with topological features and predictive variables using an appropriate predictive model function. From the Nth generation, the seed entities for next generation N+1 (e.g., the generation directly after generation N) may be selected or identified based on a risk score threshold or other predefined rules. Each iteration may be subject to a stopping rule or condition, where each entity may be selected as a seed only if the risk score for the entity is within a range defined by a lower threshold and upper threshold, e.g., greater than a lower threshold $r_L$ or less than an upper threshold $r_H$. For example:

If entity $r^j(x) \leq r_L$ then stop and do not select as seed entity for next generation (risk may be very low and no further risk assessment may be necessary)

If $r^j(x) \geq r_H$ then stop do not select as seed entity for next generation (risk may be very high and no further risk assessment may be necessary)

Other stopping rules may be based on network size and volume in order to meet economic objectives. Once the algorithm has reached the last iteration, the results may be sent to case management software or applications in step 525.

Figure 6:
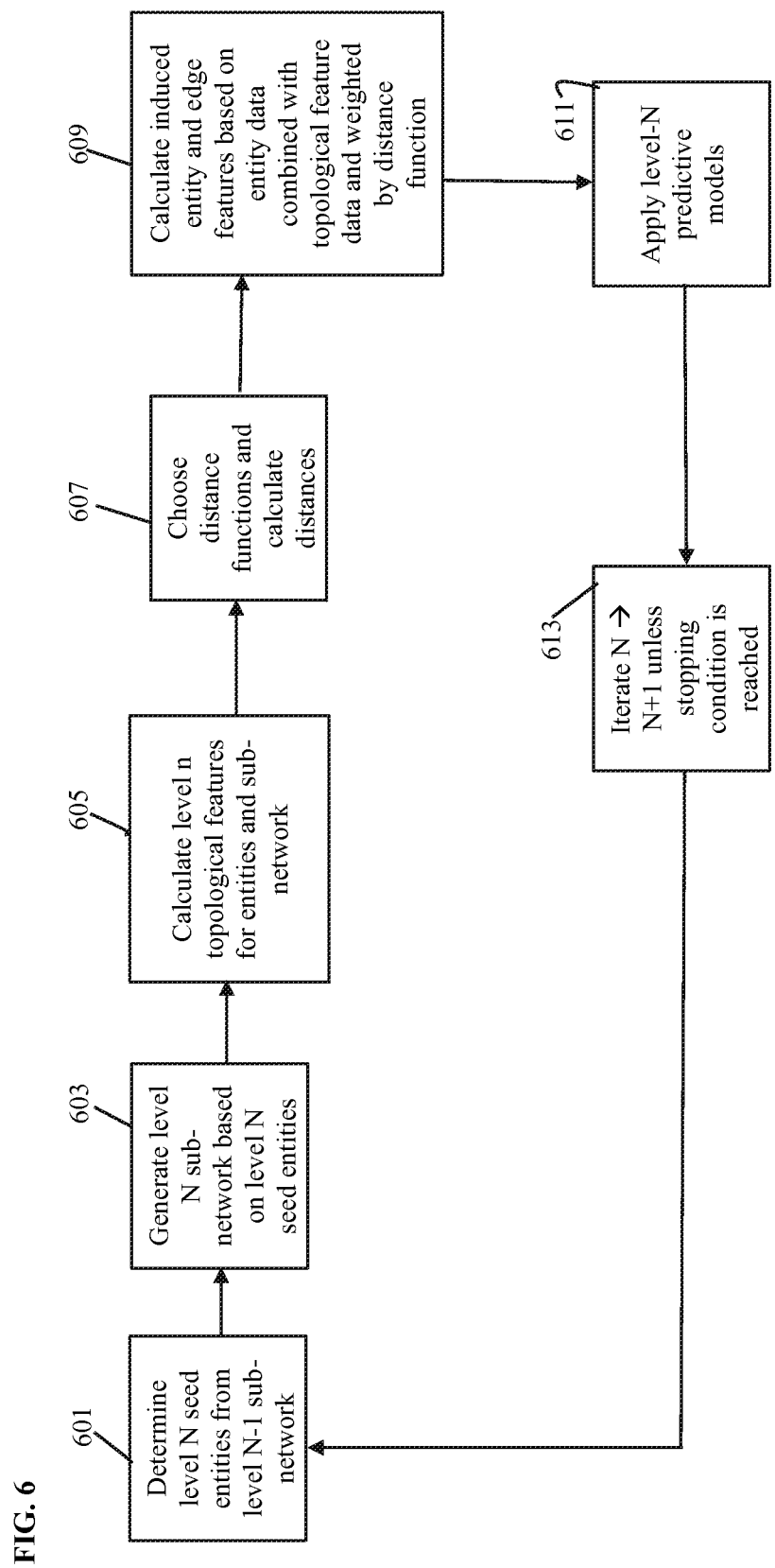
FIG. 6 is a flowchart describing the iterative generation of sub-networks and calculating predictive features for each of the sub-networks at generation N, according to embodiments of the invention.

FIG. 6 is a flowchart describing the iterative generation of sub-networks and calculating predictive features for each of the sub-networks at generation n. Each sub-network generation N may also be termed level N, in that subsequent generations may be subject to more complex calculations and predictive features. For each sub-network, as explained previously, the level N seed entities may be selected based on the level N−1 sub-network in step 601. Generation N−1 may refer to the sub-network generation directly previous to a current generation N. In step 603, a level N sub-network based on level N seed entities may be generated. In step 605, level N topological features for entities and the generated sub-network may be calculated. At the network topology level, predictive variable may be based on topological predicates $P_1$, $P_2$, $P_3$, . . . etc. Each P=P(n) may indicate the presence in the network n of a feature such as: cycle, multi-path, source, sink, exchange, etc. Many more features may be defined based purely on the topology (e.g., visual) structure itself or by joining a predicate with a complementary condition based on entity, event, or link data. For example, a source pattern may be considered a distribution if the money coming into it approximately equals the money going out of it when summed over a limited period of time.

A neighborhood network of degree m of entity A may be represented as graphs made of all entities linked to A by up to m steps where each step is an edge or link identified in the full dataset. The boundary of $n^m(A)$ the network neighborhood of degree m of A, is the set of entities $n^{m+1}(A) - n^m(A)$. A sub-network of a network n consists in a subset of the nodes of n such that there is at least one path connecting each pair of its members.

Topological features may be defined as $TF_i = <E, \ldots>$ and may be described as n-tuples, whose first element is a set of edges E of an abstract graph to which actual network edges can be mapped, together with other mappings of E, depicting additional edge properties (such as directionality, weights of various kinds etc.) and conditions that the nodes in E, must satisfy. For example the exchange feature may be defined as $<\{a,b\}, d, \Phi>$ where d is the function assigning to $\{a,b\}$ the value $<1, -1>$ indicating that the nodes a and b are linked in both directions. Nodes a and b may have an incoming and outgoing relationship between them, e.g., a may have transferred money to b, and vice versa. The empty set of conditions $\Phi$ may indicate that neither a nor b need to satisfy any additional condition.

Another example of a topological feature may be a gateway, which identifies whether a node is an access point to another network. This feature may be defined as gateway(j, k)=$<\{a\}, p>$ such that a is the boundary of the network and p is the predictive variable that indicates if the network n is of degree m then there are more than j entities in $n^{m+1}$ linked to a and that there are fewer than k entities in the boundary of $n^m$ satisfying the condition.

Topological features (TF) may be represented by a binary value indicating if 'n has TF' or not. Following that, a more complex function can be used (count, min, max, avg., etc.) as a predicate variable. For example, counting the number of nodes which have a particular topological feature may be used as a predictive variable for the entire network. If there is a structure-preserving mapping $\phi$ from a sub-network of a network n to some TF than it is said that 'n has TF' and this induces a predicate of nodes: $P_{TF}(a) \Leftrightarrow [a \in n \ \& \ a$ is in the first element the set of the range of $\phi$: n→TF]. Such predicates may facilitate definitions of multiple counter functions, which may count events or occurrences of particular characteristics or features. Counter functions may also include functions that determine a minimum, maximum, or average value across the nodes. Counter functions can serve as predictive variables, such as $\Sigma_{a \in n}\chi[P_{TF}](a)$, where $\chi[P_{TF}]$ is the characteristic function of $P_{TF}$. The generation of such candidate functions may be automated so they can be tested in the context of predictive model development using standard dimensionality reduction algorithms.

Given a function (attribute) g of a (node a in a network n), where g is defined based on a's entity level data or based on functions whose inputs are the entities directly linked to a in n, further predictive variables can be defined. These variables can be candidates for inclusion in predictive network models and can be defined as $h(n)=\Sigma_{a \in n}\chi[P_{TF}](a)*g(a)$. The equation may describe a sum of nodes having a specific TF in the network n multiplied by g(a), where g(a) may be used as a weight for the function, representing the importance/strength of node (a). For example, g(a) can be the distance of node(a) from a focal node or seed node, and as such this can be used to weigh the TF of a source. This may be because distant nodes might have a weaker effect on the network (and/or vice versa, depending on the function g and the specific TF).

In step 607, distance functions may be selected. Seed entities may be used to generate new predictive variables, which may include different distance functions. For every entity x of the network (sub-network, or network neighborhood) and seed entity b: the base distance function may be defined as: $d^b(x)$=distance (b,x)=length of the shortest path from b to x. More complex and informative distance functions can be defined by modifying d using entity level and edge-level information.

In step 609, induced entity and edge features may be calculated based on entity data combined with topological features calculated in step 605 and weighted by distance calculated in step 607. The network features or predicates, induce predicate of the network entities: for example, to the "cycle" feature corresponds the entity-level predicate 'x is on a cycle'. From these induced predicates, many entity level and network level predictive variables may be created, e.g. by counting entities satisfying the predicates and by summing over monetary amounts associated with respective links or edges in the networks, with potentially additional qualifying conditions. Additional variables are induced based on seed entities that the network may include, which enable weighting the presence of a topological feature in a network by its distance from the seed entities. In a similar way variables can be created from properties of edges, for example the property of the edge connecting x and x' that x and x' have similar-sounding names gives rise to a counter variables counting the # of such pairs in a network.

Each sub-network may include at least one seed entity. Often there will be more than a single seed entity. For example, if the key link-type represents a monetary transfer and the seed entity is a than the payer to a or the payee(s) of a could be considered also seed entities, especially if the risk estimate of a in the previous iteration is high. Seed entities may induce further structure onto each neighborhood network, facilitating the definition of many additional functions that can generate candidate predictive variables. A basic example is based on the fact that each seed entity defines a sub-network. The connections between the sub-networks of the seed entities as well as basic summary functions, such as their size and their own topological features, can be used as additional predictive variables. A less basic, and very important additional example is the definition of predictive variables as network functions based on distance from seed entities.

The generalized functions h(n) defined above can incorporate the distance function selected and can be further generalized by, for example, the transformation: $h(n) \to h'(n,b) = \Sigma_{a \in n}\{\chi[P_{TF}](a)*g(a)/d^b(a)\}$. In this manner a very large number of potential variables can be defined, and these can be naturally ordered by complexity based on the degree of the sub-network n.

In step 611, a rating or score may be calculated for the sub-network by applying level n predictive or expert models, based on the predictive variables calculated in steps 605, 607, and 609. Unless a stopping condition is reached, the process may repeat or iterate to generation N+1 in step 613, and the same algorithms and calculations may be performed on a new sub-network.

Figure 7:
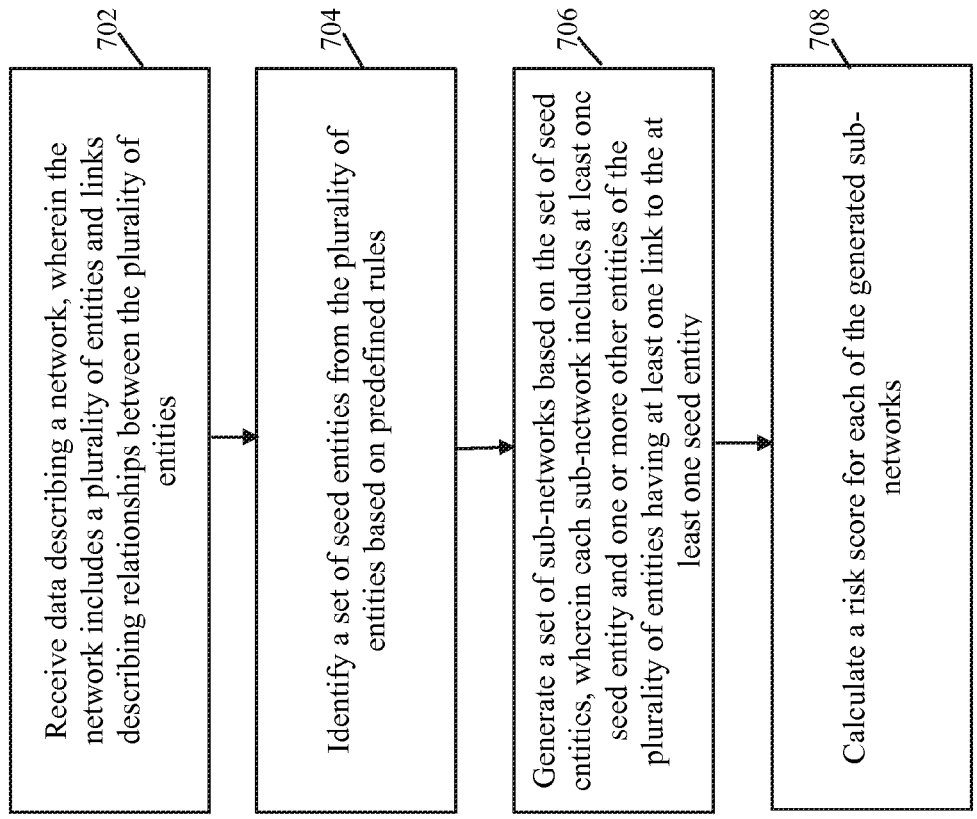
FIG. 7 is a flowchart of a network risk assessment, according to embodiments of the invention.

FIG. 7 is a flowchart of a network risk assessment, according to embodiments of the invention. A system may include a processor and memory (e.g., processor 107a and memory 107b in FIG. 1) may implement software for performing a network risk assessment method. In step 701, a processor may receive data describing a network, where the network includes a plurality of entities and links describing relationships between the plurality of entities. The network may be in the form of a graph or table or other data structure describing relationships between nodes or entities. In step 704, the processor may identify a set of seed entities from the plurality of entities based on predefined rules. Each of the seed entities, for example, may have a known risk score, and a predefined rule may allow selection of the entities as seeds if they have a known risk score greater than a threshold. In step 706, the processor may generate a set of sub-networks based on the set of seed entities. Each of the sub-networks may include at least one seed entity and one or more other entities of the plurality of entities having at least one link to the at least one seed entity. In step 708, the processor may calculate a risk score for each of the generated sub-networks. In some embodiments, the processor may generate a plurality of sets of sub-networks by iteratively selecting different sets of seed entities.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A method for network risk assessment, comprising:
    receiving, by a processor, data describing a network, wherein the network includes a plurality of entities and links describing relationships between the plurality of entities;
    identifying a set of seed entities from the plurality of entities based on predefined rules;
    generating a set of sub-networks based on the set of identified seed entities, wherein each sub-network includes at least one seed entity and one or more other entities of the plurality of entities having at least one link to the at least one seed entity;
    calculating a risk score for each of the generated sub-networks;
    generating a plurality of sets of sub-networks iteratively by:
        a) identifying an Nth set of seed entities from the plurality of entities, based on the risk scores calculated for the N−1 set of sub-networks;
        b) generating an Nth set of sub-networks based on the identified Nth set of seed entities; and
        c) calculating the risk scores for each of the sub-networks in the Nth set; and
        repeating steps a) through c) until a stopping condition is reached, wherein a lower threshold and upper threshold define a range and the stopping condition is reached when the risk scores of the entities are less than a lower threshold or greater than an upper threshold; and
    providing a fraud alert regarding whether one of the entities or sub-network is at risk for suspicious financial activity either when a respective calculated risk score is below a risk score threshold or when a respective calculated risk score is above a risk score threshold.

2. The method of claim 1, wherein the set of sub-networks includes one sub-network generated for each identified seed entity.

3. The method of claim 1, comprising:
    identifying a new set of seed entities from the plurality of entities;
    and generating a new set of sub-networks based on the new set of seed entities.

4. The method of claim 3, wherein the seed entities in the new set have a risk score greater than a lower threshold and less than an upper threshold.

5. The method of claim 1, wherein sub-networks in the Nth set of sub-networks have a greater maximum degree than the maximum degree of the sub-networks in the previous N−1 set of sub-networks, wherein the maximum degree of a sub-network is a maximum number of links between entities in the sub-network.

6. The method of claim 1, comprising calculating a risk score for each of the entities in the generated sub-networks.

7. The method of claim 1, comprising receiving a query describing a transaction between or among entities and generating a sub-network based on the entities described in the query.

8. The method of claim 1, comprising:
    receiving a query describing a transaction between entities;
    determining whether the entities described in the query are present in any of the generated sub-networks; and
    calculating a risk score for the received transaction.

9. A system for network risk assessment, comprising:
    a processor configured to:
    receive data describing a network, wherein the network includes a plurality of entities and links describing relationships between the plurality of entities;
    identify a set of seed entities from the plurality of entities based on predefined rules;
    generate a set of sub-networks based on set of the identified seed entities, wherein each sub-network includes at least one seed entity and one or more other entities of the plurality of entities having at least one link to one or more of the seed entities;
    calculate a risk score for the generated sub-networks;
    generate a plurality of sets of sub-networks iteratively by:
        a) identifying an Nth set of seed entities from the plurality of entities, based on the risk scores calculated for the N−1 set of sub-networks;
        b) generating an Nth set of sub-networks based on the identified Nth set of seed entities; and
        c) calculating risk scores for each of the sub-networks in the Nth set; and
        repeating steps a) through c) until a stopping condition is reached wherein a lower threshold and upper threshold define a range and the stopping condition is reached if the risk scores of the entities are less than a lower threshold or greater than an upper threshold; and
    providing a fraud alert regarding whether one of the entities or sub-network is at risk for suspicious financial activity either when a respective calculated risk score is below a risk score threshold or when a respective calculated risk score is above a risk score threshold; and
    a memory configured to store the data describing the network, the generated set of sub-networks, and the risk scores.

10. The system of claim 9, wherein the processor is configured to:
    identify a new set of seed entities from the plurality of entities;
    and generate a new set of sub-networks based on the new set of seed entities.

11. The system of claim 9, wherein sub-networks in the Nth set of sub-networks have a greater maximum degree than the maximum degree of the sub-networks in the previous N−1 set of sub-networks, wherein the maximum degree of a sub-network is a maximum number of links between entities in the sub-network.

12. The system of claim 9, wherein the processor is configured to:
    receive a query describing a transaction between entities and generating a sub-network based on the entities described in the query.

13. The system of claim 9, wherein the processor is configured to:
    receive a query describing a transaction between entities;
    determine whether the entities described in the query are present in any of the generated sub-networks; and
    calculate a risk score for the received transaction.

* * * * *